Figure 1:
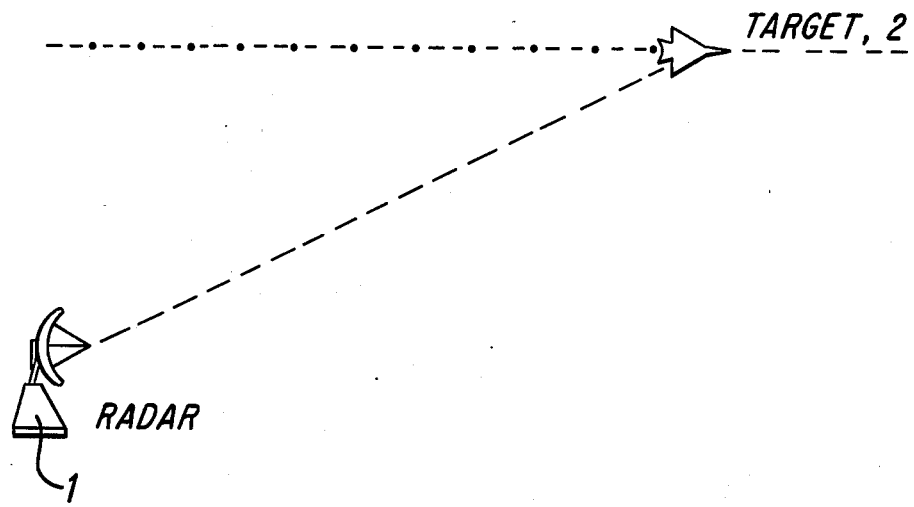

United States Patent [19]
Krogager

[11] Patent Number: 4,786,906
[45] Date of Patent: Nov. 22, 1988

[54] METHOD OF MOTION COMPENSATION IN SYNTHETIC APERTURE RADAR TARGET IMAGING AND A SYSTEM FOR PERFORMING THE METHOD

[75] Inventor: Ernst Krogager, St. Merløse, Denmark

[73] Assignee: Forsvarets Forskningstjeneste, Denmark

[21] Appl. No.: 32,727

[22] PCT Filed: Jun. 16, 1986

[86] PCT No.: PCT/DK86/00068
§ 371 Date: Feb. 12, 1987
§ 102(e) Date: Feb. 12, 1987

[87] PCT Pub. No.: WO86/07635
PCT Pub. Date: Dec. 31, 1986

[30] Foreign Application Priority Data
Jun. 17, 1985 [DK] Denmark ............................ 2722/85

[51] Int. Cl.$^4$ ........................ G01S 13/90; G01S 13/80
[52] U.S. Cl. ........................................ 342/25; 342/43; 342/192; 342/196
[58] Field of Search ................ 342/6, 25, 42, 43, 187, 342/192–196

[56] References Cited
U.S. PATENT DOCUMENTS
3,522,602  8/1970  Ver Planck .............................. 342/6
4,134,113  1/1979  Powell ................................... 342/25

FOREIGN PATENT DOCUMENTS
80107153   11/1980  European Pat. Off. .
0031443     7/1981  European Pat. Off. .
83303485.3  6/1983  European Pat. Off. .
33000876    7/1980  Fed. Rep. of Germany .
3248879     4/1984  Fed. Rep. of Germany ........ 342/25
0015178     1/1983  Japan ................................... 342/25
0188866     9/1985  Japan ................................... 342/25
2165413     4/1986  United Kingdom ................. 342/25

Primary Examiner—Theodore M. Blum
Assistant Examiner—Bernarr Earl Gregory
Attorney, Agent, or Firm—Kane, Dalsimer, Sullivan, Kurucz, Levy, Eisele and Richard

[57] ABSTRACT

When determining the detailed radar reflection cross-section of a radar target by ISAR techniques it is a known problem that one of the target motion components is to be compensated. This was done in the past by complicated numerical calculations of the path of the target. According to the described method, the motion compensation is determined by means of an auxiliary signal which is transmitted form the target. The described method enables the achievement of a radar reflection cross-section by real time data processing of the signals received. Also an apparatus for performing the method is described.

3 Claims, 5 Drawing Sheets

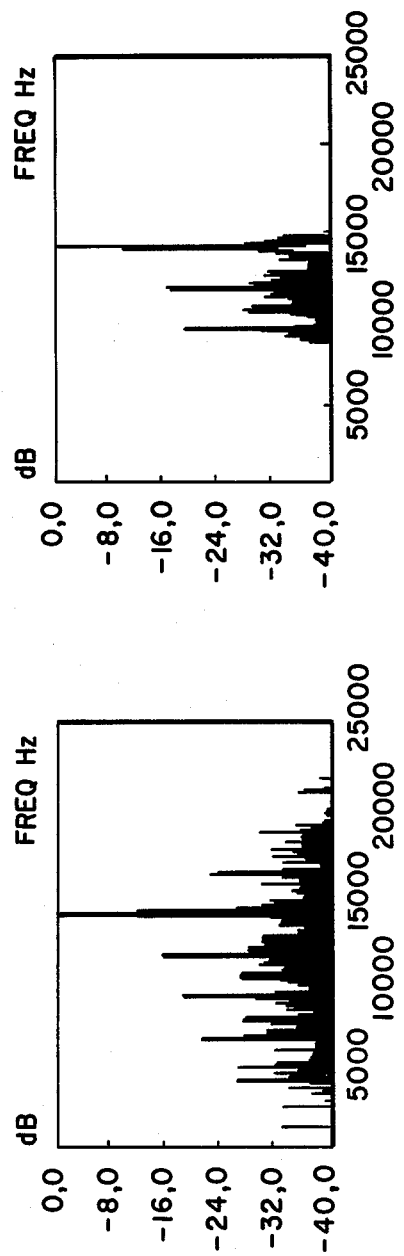

METHOD OF MOTION COMPENSATION IN SYNTHETIC APERTURE RADAR TARGET IMAGING AND A SYSTEM FOR PERFORMING THE METHOD

The present invention concerns a method of phase compensation in synthetic aperture radar target imaging.

In a synthetic aperture radar, the synthetic aperture is produced periodically by sampling the radar doppler signal from the target during its motion. This can be done with a pulse radar and a CW radar. Where a pulse radar is used, the scanning frequency will be equal to the pulse repetition frequency (PRF) of the radar. Where a CW radar is used, the sampling frequency may be selected as desired.

When a target is illuminated with a radar, the reflected signal contains doppler information which is caused by all the motion components of the target. These are mainly a translatory motion and a rotary motion. If it is possible to compensate for the part of the doppler shift which is caused by the translatory motion, the target, as seen from the radar, will be stationary and rotate about an axis through a given point of reference. This means that it will be possible to measure the distribution of radar cross-section across the target by determining the doppler spectrum with a sufficiently good resolution or for a sufficiently long time.

To measure the distribution of the radar cross-sections across the target, it is necessary, as mentioned above, to correct the measured doppler shift for the part caused by the translatory motion of the target. This may be done e.g. by determining the path and velocity of the target and calculating on the basis of this the doppler shift caused by the translatory component of the motion. However, this is subject to great uncertainty, and moreover it is not possible to compensate for doppler shift which is caused by the influence of the propagation path on the signals, or which is caused by slight target deviation from the measured/calculated course.

The invention is based on the finding that when placing a modulating, coherent transponder on the target it is possible to produce a reference signal which is coherent with the illuminating radar signal and which can be used for compensating for the translatory motion of the target.

This compensation provides the additional advantage that the reference signal used for the compensation propagates through the same propagation path as the illuminating signal, so that also the influence of the propagation path on the illumination signal is compensated.

Figure 2:
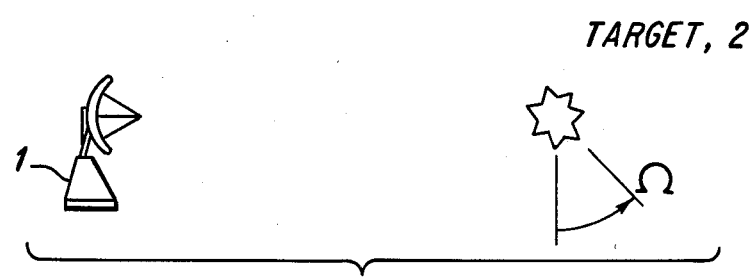
Figure 3:
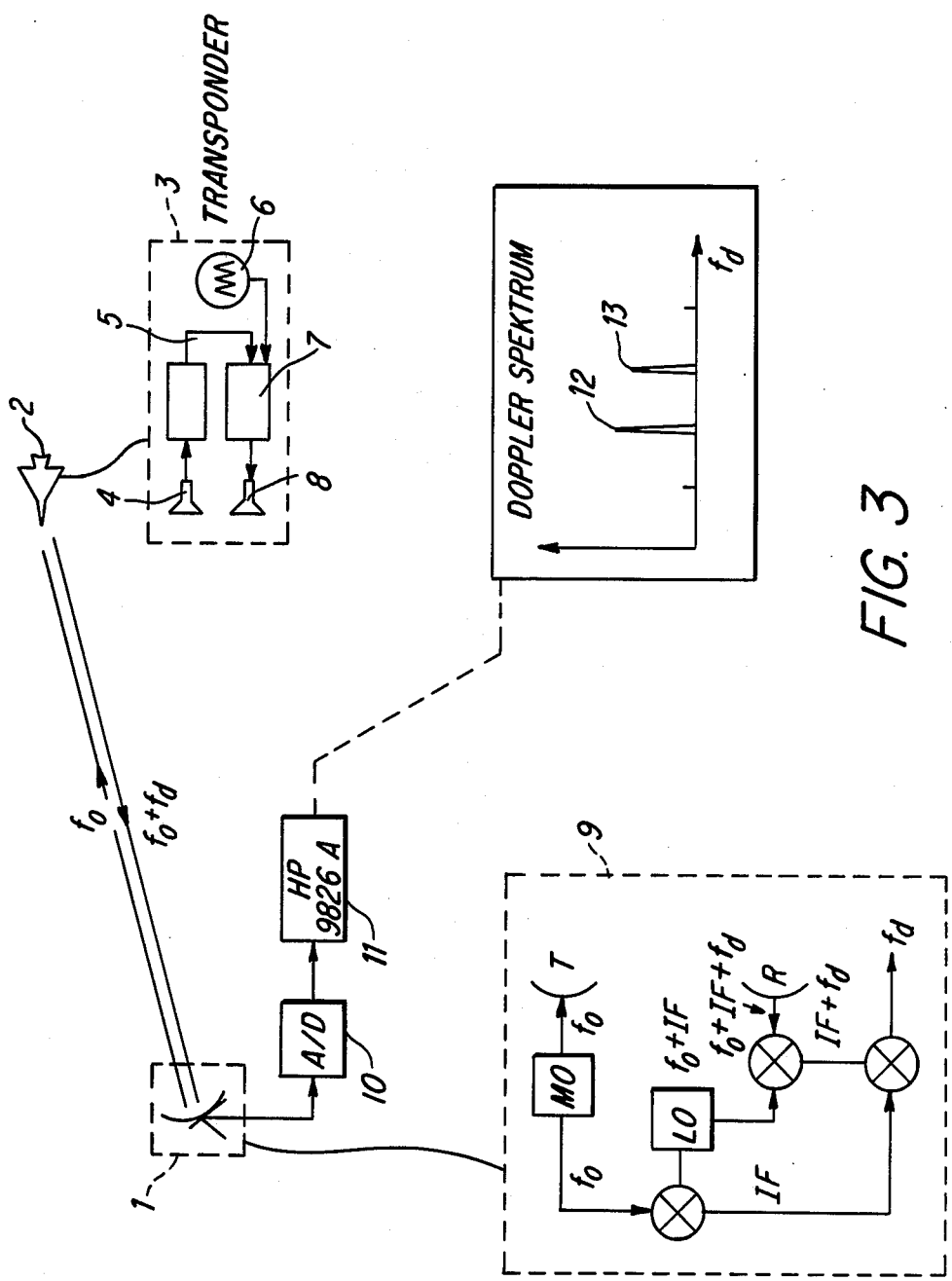
Figure 4:
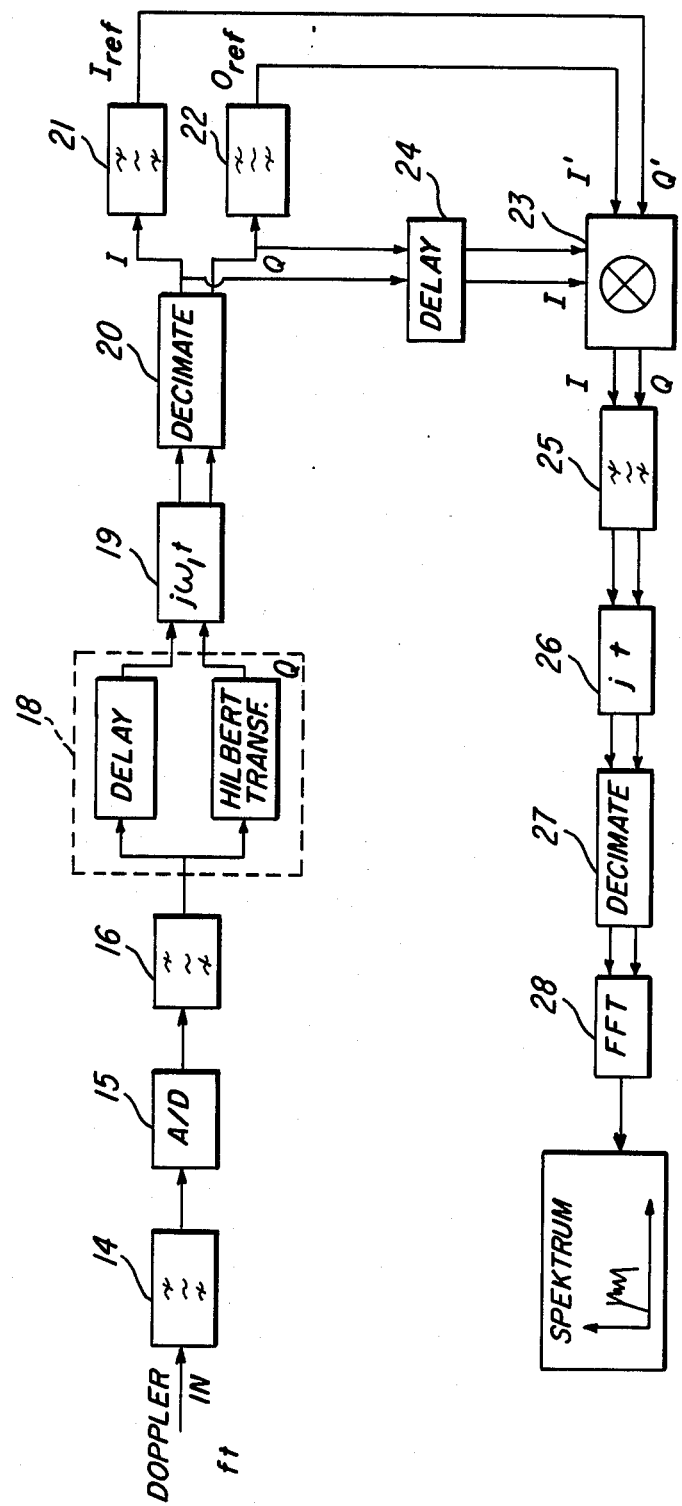

The invention will be described more fully below with reference to the drawing, in which FIG. 1 shows how a radar and a target, here an aircraft, move with respect to each other, FIG. 2 shows an imagined situation where a radar and a target perform the same translatory motion, FIG. 3 is a simplified block diagram showing the means necessary for performing the method of the invention, FIG. 4 is a block diagram of a digital processing unit for processing the signals received from the radar, and FIGS. 5-10 are examples of the spectral distribution of the radar signals received, and of how these spectral distributions change when the signal is processed in accordance with the present method.

FIG. 1 shows the relation between target and radar in the ordinary situation where the radar is stationary and the target moves. Below, it is generally assumed that the target is an aircraft. However, the present invention may also be applied to determination of radar reflection distributions of all types of vehicles. But the aircraft is here taken as an example since the method is of special interest for the identification of aircraft by their radar reflection distribution. As will be seen from FIG. 1, the motion of the target may be resolved into a translatory and a rotary part. The rotary motion entails that the individual parts of the aircraft contribute with different doppler shifts, and the reflected radar signal thus contains information on the distribution of reflection cross-sections across the target. FIG. 2 shows the imagined situation: the radar follows the translatory motion of the target. This provides the effect that the target, as seen from the radar, now performs a purely rotary motion with a given angle velocity $\Omega$. As mentioned, this is an imagined situation, but this situation may be simulated if it is possible to compensate for the part of the radar signal which is caused by the translatory motion. This compensation was previously made by calculating the translatory motion of the target because the phase variation caused by this part of the motion can be determined on the basis of this calculation. However, this calculation is subject to considerable uncertainty because the calculations cannot allow for the possibility that the target does not move along a completely straight line, but fluctuates around it. Further, a not insignificant phase shifting of the signal occurs, corresponding to a doppler shift because of inhomogeneities in the refraction index of the atmosphere. Therefore, it is not possible to obtain a sufficiently good compensation for the translatory motion, and accordingly, the determination of the type and cross-section of the target is subject to considerable uncertainty.

According to the present invention, a coherent, modulated transponder is placed on the target. The return signal of this transponder is then used for performing the necessary motion compensation. The output signal of the transponder is frequency-shifted with respect to the radar signal and is coherent with it. This means that the output signal of the transponder has the same phase variation as the received illuminating radar signal. The signal from the transponder is isolated from the rest of the target doppler spectrum because of the frequency shift. This signal may therefore be filtered from the other radar return signal and give the phase information necessary for performing the motion compensation. This reference signal also gives information on the phase changes which are caused by atmospheric refraction index variations since the reference signal also propagates along the same propagation path as the illuminating radar signal. Thus, this reference signal makes it possible to simulate the imagined situation which is shown in FIG. 2, and this situation is equivalent to slow target rotation at a fixed position in front of the radar.

FIG. 3 shows schematically what means are necessary for performing the method of the invention. A CW radar 1 illuminates a target 2 with a signal of the frequency $f_o$. A signal of the frequency $f_o + f_d$ is reflected from the target 2, with $f_d$ being the doppler shift. The target carries a transponder 3 comprising a receiver antenna 4, an amplifier 5, a modulation oscillator 6, a frequency changer 7 and a transmitter antenna 8. The transponder receiver antenna 4 catches the illuminating signal from the radar 2, and this signal is amplified in the amplifier 5, from which it is transferred to the frequency changer 7 in which the signal is modulated with the signal from the oscillator 6. The modulated signal is transmitted from the transmitter antenna 8. This signal is received together with the reflection of the illuminating signal by the receiver antenna of the radar.

The receiver antenna of the radar is connected to a radar receiver of an ordinary type shown schematically at 9 in FIG. 3. The output signal $f_d$ of the receiver contains doppler components originating from target motions, and the signal $f_d$ also contains a component originating from the transponder. The output signal $f_d$ of the radar receiver is sampled and digitized in an analog/digital converter 10. The digitized samplings are transferred to a calculation unit 11 performing a Fast-Fourier transformation of the signal. This determines the spectral distribution of the signal $f_d$. This spectrum then contains a part 12 originating from the target, and a part 13 originating from the transponder. It is possible to separate these two parts of the spectrum from each other with an arbitrary frequency spacing. According to the present invention, preferably a spacing of about 5 kHz between the two spectral components is used. The output signal from the receiver 9 is thus composed of a part containing the total amount of doppler shifts caused by target motions, and a part enabling compensation for the part of the doppler shift which is caused by the translatory motion of the target. To obtain the desired compensation, the doppler signal must be multiplied by the complex conjugate of the reference signal.

A particularly advantageous method for this calculation may be implemented with the apparatus shown in block diagram in FIG. 4. The output signal $f_d$ from the radar receiver is first bandpass-filtered in a bandpass filter 14 to remove part of possible noise. The signal is sampled and converted into digital form in a digital/analog converter 15. Then the signal is bandpass-filtered again to isolate the relevant part for further signal processing. This filtration takes place in a digital filter 16. A quadrature representation of the signal is produced in the unit 18 by means of a Hilbert transformation. The unit 19 frequency-shifts the signal, which is decimated in the unit 20 to reduce the amount of data so as to enable considerably faster data processing. The reference signal from the two conjugated signal components is taken from the bandpass filters 21 and 22. The reference signal is multiplied by the entire signal in the multiplier 23. To retain the mutual phase relation of the signals the two signal components are subjected to time delay in the delay unit 24 in such a manner that the mutual phase relation between these signal components and the reference signal components is maintained.

The output signal of the multiplier 23 is bandpass-filtered in the filter 23 and frequency-shifted in the circuit 26. To increase the data processing rate, the signals are decimated again in the unit 27. The output signal of the unit 27 is supplied to a Fast-Fourier transform calculating unit 28 which calculates the signal spectral distribution resulting from the signal processing.

The signal processing described above is extremely comprehensive, and it is necessary that the filters are formed with a great flank steepness and also have good amplitude and phase properties. However, it is possible with fast microprocessors to implement these filters and the other signal processing so as to obtain real time signal processing. This enables current display of the signal spectrum received. This current display may have great advantages where the present method is to be used for identification of e.g. aircraft.

Figure 8:
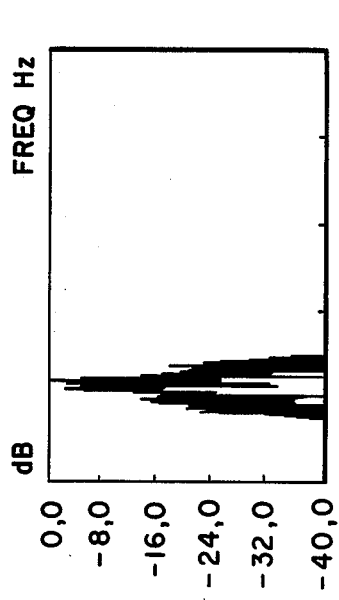
Figure 7:
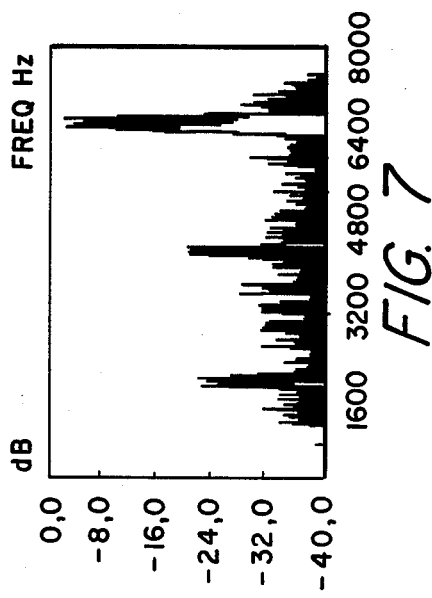
Figure 9:
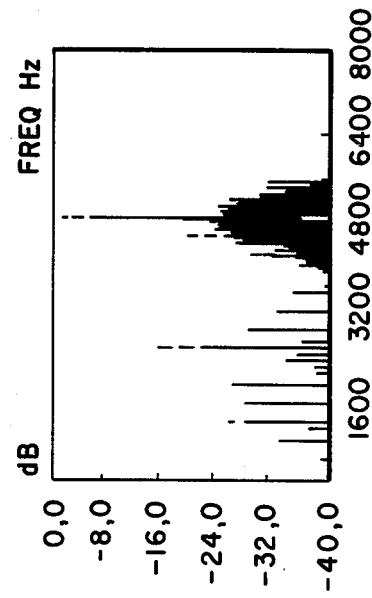

FIG. 5 is an example of the spectrum of the unprocessed data. FIG. 6 shows the spectrum after data bandpass filtration. FIG. 7 shows the spectrum after the data have been frequency-shifted and decimated the first time. FIG. 8 shows the spectrum of the reference signal alone. FIG. 9 shows the signal spectrum occurring when the signal in FIG. 7 is multiplied by the complex conjugate of the signal in FIG. 8.

Thus, FIG. 9 shows the spectrum occurring when the doppler signal (FIG. 7) is multiplied with the reference signal (FIG. 8). It will be seen that a spectral line occurs at zero frequency, which is tantamount to the reference having been multiplied with itself. In addition, it is noted that the rest of the spectrum is gathered around the frequency 4.8 kHz. This frequency is the frequency shift of the transponder in the present example. It is noted that this offset frequency in itself may be determined quite accurately (with a few Hz uncertainty) because of the coherent signal processing. This offset frequency can in itself be a significant characteristic for the individual aircraft.

The part of the spectrum which is compressed around the frequency 4.8 kHz can be filtered off (filter 25 from FIG. 4). Then the data amount is decimated (unit 25, FIG. 4), following which the spectrum shown in FIG. 10 occurs in a Fast Fourier transformation analysis of the spectrum from FIG. 9.

Figure 10:
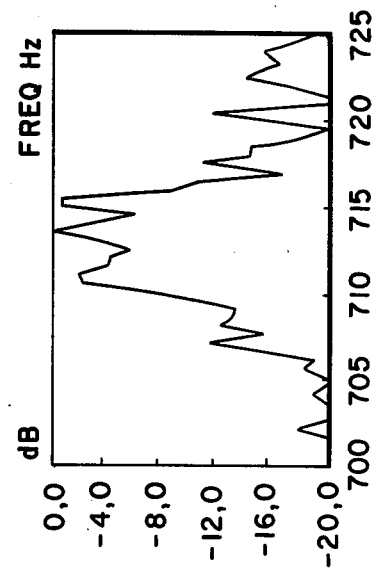

It appears from FIG. 10 that the spectrum is now compressed so much that the width of the spectrum corresponds to the various doppler frequencies occurring because of the motion of the individual aircraft reflection areas. Thus, it will be seen that it is possible to plot a radar profile for the target with a resolution which is sufficiently good for individual reflectors on the target to be determined, and their contribution to the total radar profile may likewise be determined.

It is assumed in the foregoing that only one reference source is used. Of course, it is possible to use several such reference sources, and if several different reference signals are used, an improved resolution is obtained because it is then possible to resolve relative motions between several reference points on the target and thereby reduce the influence of their phase errors.

Thus, the method described above permits plotting of radar profiles for domestic vehicles and storing of these in a data bank. In a crisis, it will thus be possible to distinguish between domestic transponder carrying aircraft from hostile aircraft by plotting the radar profile of the aircraft and comparing this radar profile with the profiles stored in the data bank. In case of consistency between the measured and the stored profiles, this gives a good certainty of identification of domestic aircraft. This identification system may advantageously be used instead of or as a supplement to known identification systems where the aircraft sends coded signals to the receiver. It is known that the ordinarily used IFF (identification Friend or Foe) systems are relatively easy to disturb and overload, so that domestic and hostile aircraft cannot be distinguished with sufficient certainty.

If the enemy should realize that his opponent's aircraft carry transponders of the above-mentioned type and should equip his own aircraft with such transponders as a precaution, it will still be possible to distinguish hostile aircraft from domestic aircraft because the hostile aircraft very likely do not have the same radar profile as the domestic aircraft.

A condition of reliable operation of such an identification system is that a large number of radar profiles of domestic aircraft are taken in advance. This was extremely difficult in the past because it was necessary to place the aircraft on a rotating platform and to rotate the aircraft in front of a radar at a relatively short distance from the aircraft to plot the radar profile of the aircraft in this manner. This method of taking an aircraft radar profile is subject to great uncertainty because it is difficult to remove the aircraft and antenna so far from each other as to avoid near field effects. However, the method described in the foregoing makes it possible to plot the radar profile of the aircraft when airborne. The advantage is that the plotted radar profile is completely consistent with the radar profile observed in the field.

I claim:

1. A method of removing translatory doppler components in target imaging by means of a synthetic aperature radar technique, wherein the target is provided with a transponder adapted to transmit a modulated, coherent copy of a signal transmitted from a radar toward the target, a receiver being provided for reception of a reflected radar signal and the transponder signal, characterized in that signals transmitted from the radar are frequency-shifted sufficiently by means of the transponder to be completely outside the frequency region where doppler information may be expected in the radar signal reflected from the target, the reflected radar signal and the transponder signal are immediately separated in the receiver, and the radar and transponder signals are then combined by complex signal processing.

2. A method according to claim 1, characterized in that the digital processing of the signals received comprises the following steps:
   (a) bandpass filtration of a signal received from a target,
   (b) calculation of a complex representation of the received signal by means of a Hilbert transformation to provide a complex signal,
   (c) frequency-shift and decimation of the complex signal thus obtained,
   (d) bandpass filtration of the frequency-shifted and decimated complex signal to isolate the reference signal contained,
   (e) complex conjugation of the transponder signal, and multiplication of the complex signal obtained in (b) by the complex conjugated transponder signal,
   (f) bandpass filtration of signal resulting from said multiplication and decimation of said bandpass filtered signal,
   (g) performance of a Fast Fourier transformation on the said bandpass filtered and decimated signal to produce a spectrum showing the distribution of reflection contributions across the target.

3. A synthetic aperture radar system comprising a synthetic aperture radar, said radar transmitting a signal toward a target, and comprising a transponder mounted on the target, said transponder transmitting a modulated, coherent copy of the signal transmitted toward the target, and comprising a receiver to receive a reflected radar signal and the transponder signal, characterized in that the system further comprises:
   (a) transponder means for frequency shifting of the signal transmitted toward the target so that in terms of
   frequency it is completely outside the region where doppler information may be expected in the radar signal reflected from the target,
   (b) separating means separating the reflected radar signal and the transponder signal immediately upon reception, and
   (c) combination means for combining the reflected radar signal and the transponder signal so as to compensate for the translatory motion of the target and fluctuations in the propagation paths of the signals whereby to remove translatory doppler components of said combined signal.

* * * * *